Dec. 24, 1968   R. REDFERN   3,417,931
PLANT FOR PROCESSING SEMI-LIQUID SUBSTANCES OR GRANULAR
SUBSTANCES IN A LIQUID CARRIER
Filed Jan. 20, 1966   6 Sheets-Sheet 5
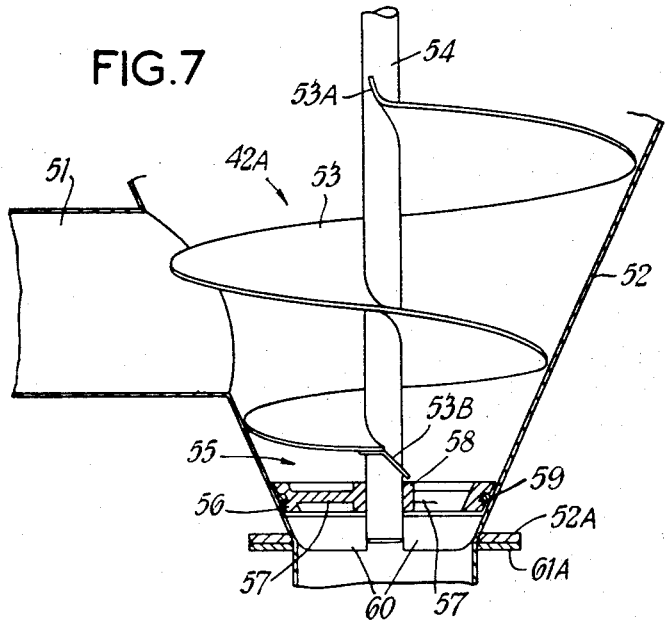
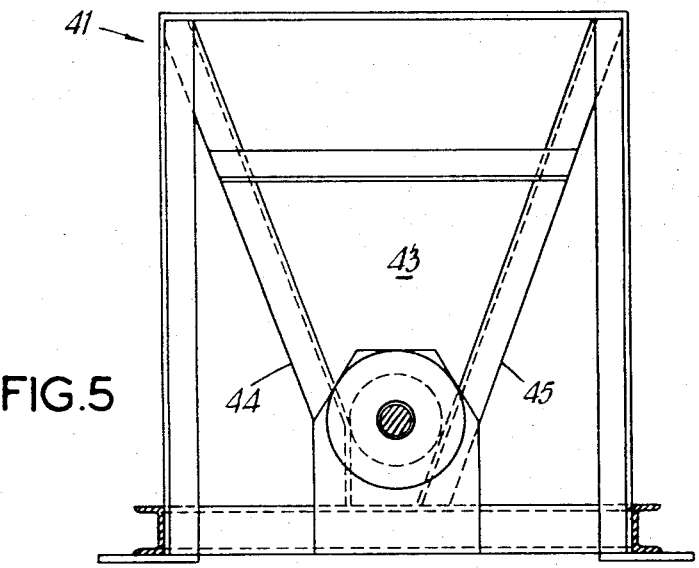
INVENTOR
Ronald Redfern
BY
Pennie, Edmonds, Morton, Taylor & Adams
ATTORNEYS

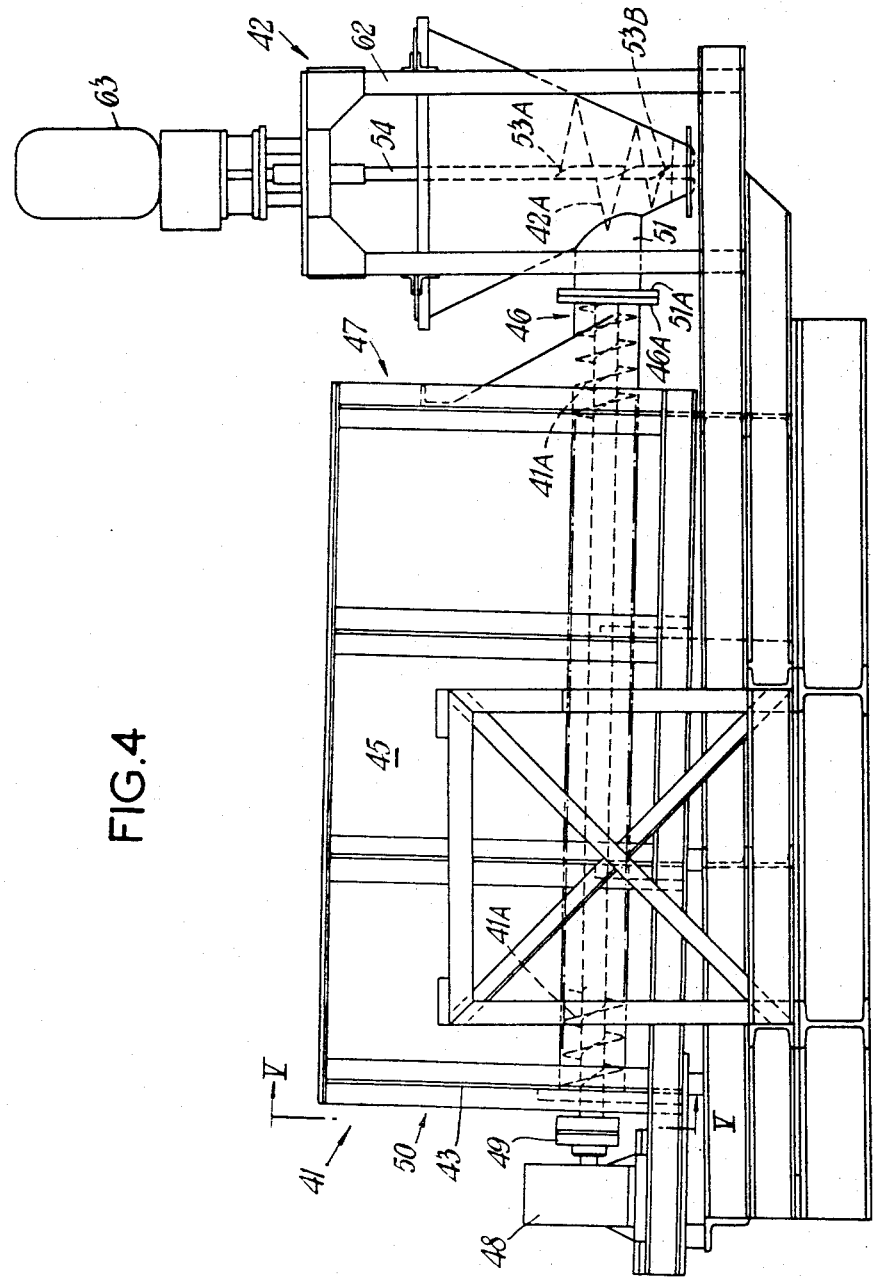

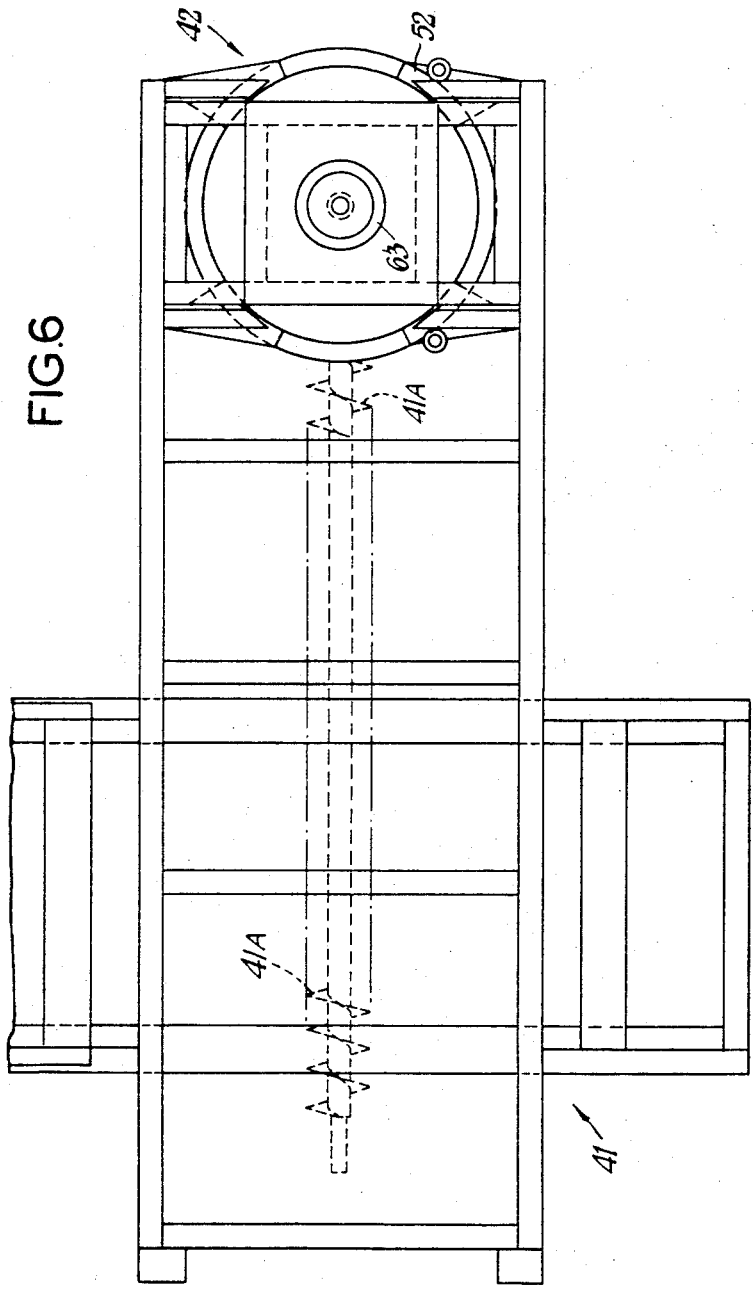

United States Patent Office 3,417,931
Patented Dec. 24, 1968

1

3,417,931
**PLANT FOR PROCESSING SEMI-LIQUID SUB-
STANCES OR GRANULAR SUBSTANCES IN
A LIQUID CARRIER**
Ronald Redfern, Banstead, Surrey, England, assignor to
John F. Renshaw & Company Limited, Mitcham,
Surrey, England, a British company
Filed Jan. 20, 1966, Ser. No. 534,949
Claims priority, application Great Britain, Feb. 1, 1965,
4,359/65
6 Claims. (Cl. 241—161)

ABSTRACT OF THE DISCLOSURE

Equipment for, and methods of, processing semi-liquid or liquid substances, or granular substances in a liquid carrier, in a set of mills connected in series, each mill having a rotor and a stator arranged to co-operate with one another to reduce to a colloidal system material fed to the mill, means for adjusting the spacing between the stator and the rotor of at least one of the mills, means for feeding material to be processed to the first mill of the set, and means for controlling the feed rate of the feeding means.

---

This invention relates to equipment for and methods of processing semi-liquid or liquid substances, or granular substances in a liquid carrier. By granular substance is meant a substance in a sufficiently divided form to be fed to a mill such as a colloid mill to be milled thereby so as to be reduced to a colloidal system. By colloidal system is meant a multiphase system in which there is at least one finely divided dispersed phase more or less uniformly distributed through the continuous phase known as the dispersion medium.

According to one aspect of the present invention there is provided equipment for processing semi-liquid or liquid substances, or granular substances in a liquid carrier, the equipment including a set of mills each having a rotor and a stator arranged to co-operate with one another to reduce to a colloidal system material fed to the mill during operation thereof, the mills of the set being connected in series so that during operation material to be processed fed to the first mill of the set passes successively through the mills to the last mill of the set, and the equipment further including adjusting means for adjusting the spacing between the stator and the rotor of at least one of the mills during operation thereof, feeding means for feeding material to be processed to the first mill of the set, and controlling means for controlling the feed rate of the feeding means.

According to another aspect of the present invention there is provided a method of processing semi-liquid or liquid substances, or granular substances in a liquid carrier, the method comprising the steps of feeding material to be processed to a set of mills each having a rotor and a stator arranged to co-operate with one another to reduce a colloidal system material fed to the mill during operation thereof, the mills of the set being connected in series so that the material to be processed fed to the first mill of the set passes successively through the mills to the last mill of the set, and the method further comprising the step(s), whilst feeding the material through the mills, of adjusting the spacing between the stator and the rotor of at least one of the mills and/or controlling the rate of feeding material to the mills, thereby to control a characteristic of the material flowing from the last mill of the set.

Figure 1:
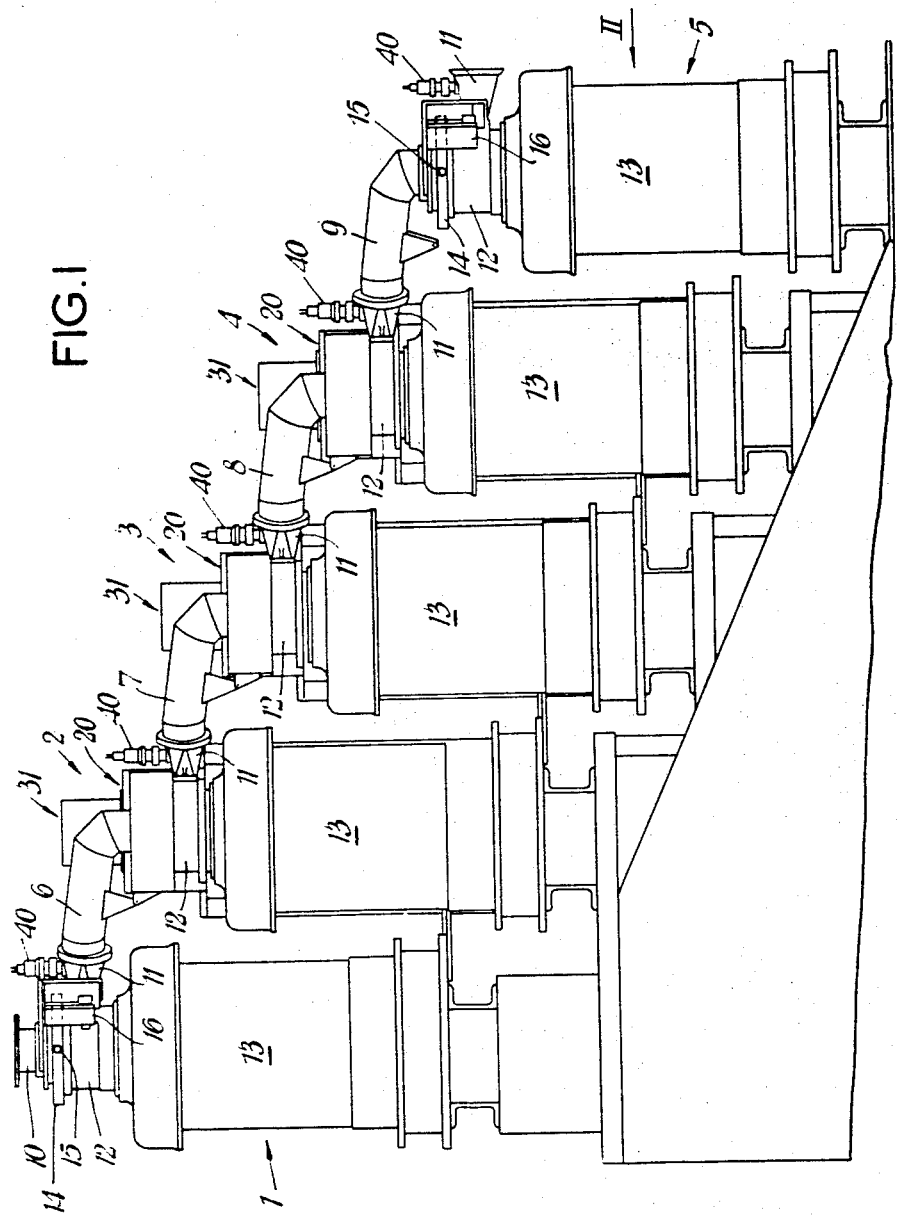
Figure 2:
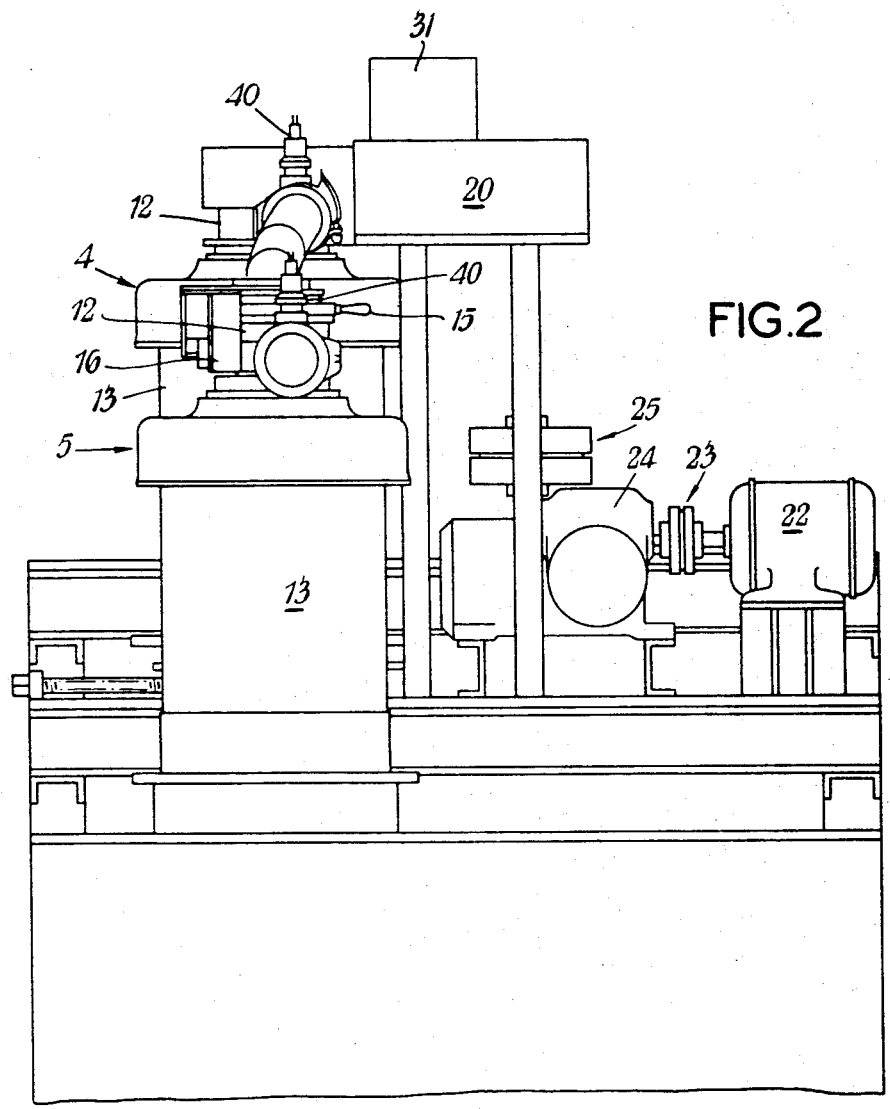
Figure 3:
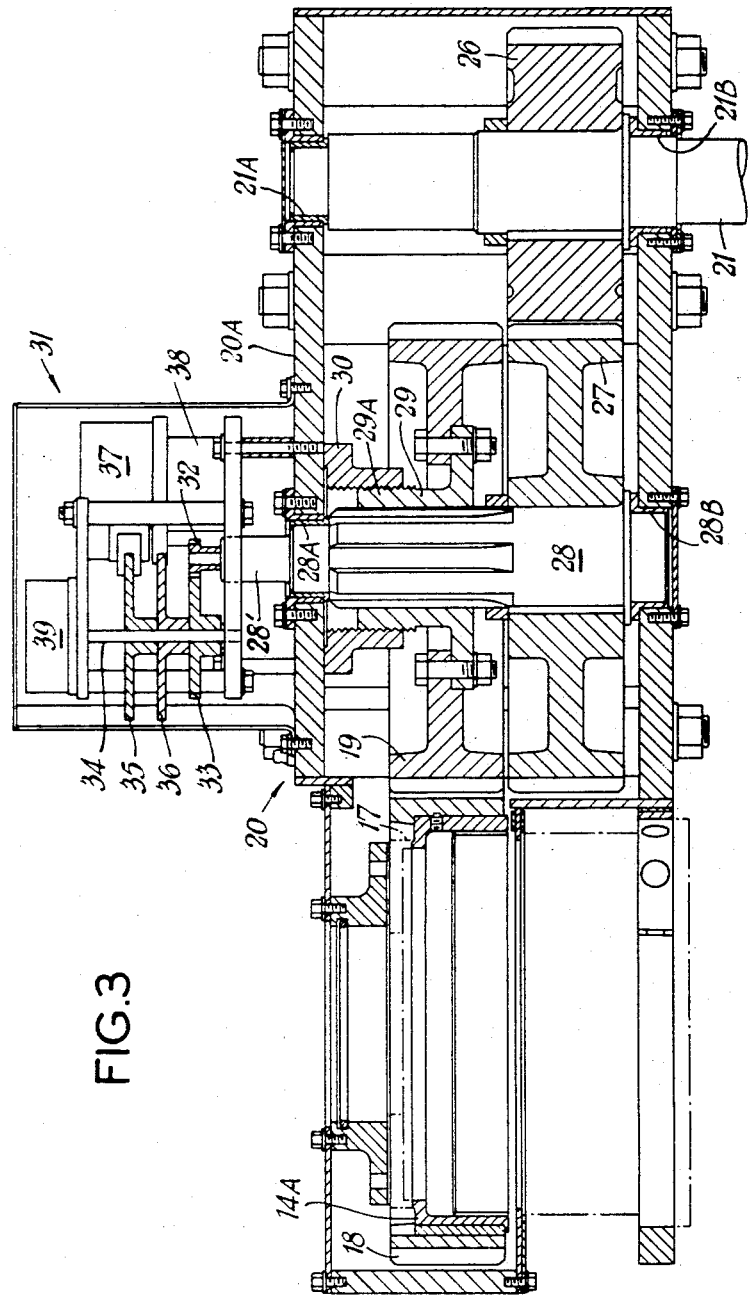

For a better understanding of the present invention and to show how the same may be carried into effect, reference will now be made, by way of example, to the accompanying drawings, in which:

FIGURE 1 is a side view of a set of colloid mills for processing semi-liquid or liquid substances, or granular substances in a liquid carrier, FIGURE 2 is an end view of part of the set of mills of FIGURE 1, taken in the direction of arrow II of FIGURE 1, FIGURE 3 is a sectional end view of part of one of the mills of FIGURES 1 and 2, FIGURE 4 is a side view of a horizontal feeder and a vertical feeder of feeding apparatus for feeding material to be processed to the set of colloid mills of FIGURES 1 to 3, FIGURE 5 is an end view of the horizontal feeder of FIGURE 4, taken on the line V—V of FIGURE 4, FIGURE 6 is a plan view corresponding to FIGURE 4, and FIGURE 7 is a sectional view, on a larger scale, of the vertical feeder of FIGURE 4.

The set of colloid mills shown in FIGURES 1 to 3 is made up of five mills 1 to 5 connected in series by ducts 6 to 9 so that material being processed passes successively from mill to mill in the direction from the mill 1 to the mill 5. The first mill 1 of the set is provided with an inlet duct 10 which is connected to feed apparatus (not shown in FIGURES 1 to 3) such as that shown in FIGURES 4 to 7 and which will be described later. The last mill 5 of the set is provided with an outlet duct 11 which is connected to a discharge spout (not shown). A similar outlet duct 11 of each of the other mills receives the duct 6, 7, 8 or 9 that connects the mill to the next adjacent mill.

Each mill of the set of mills 1 to 5 has a mill head 12 containing a frusto-conical serrated rotor (not shown) carried by a vertical drive shaft of a motor (not shown) disposed in a housing 13 below the mill head 12. The rotor is disposed, co-axially, within a serrated stator having a frusto-conical inner surface, the rotor being spaced from the stator. The smaller outer diameter of the rotor and the smaller inner diameter of the stator are uppermost and the angle of the outer curved surface of the rotor is less acute than that of the inner curved surface of the stator so that there is a larger gap between the rotor and the stator at the top of the mill head 12 than there is at the bottom. The serrations of the rotor and the stator consist of elongated slots disposed in circumferential rows on the outside of the curved wall of the rotor and on the inside of the curved wall of the stator so that the slots in the rotor co-operate with the slots in the stator. The serrations of each row are parallel with each other and are inclined with respect to the top and bottom of the row. The slots of the topmost row of the rotor and of the stator are each ⅛″ wide and ⅛″ deep. These dimensions of the slots are gradually reduced, in the slots of the succeeding rows, the corresponding dimensions of the lowest row of slots being each 30 microns. As the dimensions of the slots are reduced so the number of slots per row is increased.

The stator of each mill is mounted in the mill head 12 so as to be movable, with respect to the rotor, along the common axis of the stator and rotor whereby the spacing of the motor from the stator can be altered. In the case of each of the mills 1 and 5, the stator is carried by an annular collar 14 engaged with the upper part of the stator and screwed onto the main body of the mill head 12. The stator is keyed into the mill body and the collar 14 is free to rotate with respect to the stator. The collar 14 is provided with two diametrically opposed handles 15 which can be utilized manually to rotate the collar 14 with respect to the main body of the mill head 12 thereby raising or lowering the stator. A limit-switch assembly 16 carried by the housing 12 is provided with members (not shown) for sensing whether the stator is disposed in an uppermost operating position (corresponding to a fully open position of the mill) or a lowermost operating position (corresponding to a fully closed position of the mill). The limit-switch assemblies 16 of both mills 1 and 5 are connected to an electrical control circuit (not shown).

In the case of each of the mills 2, 3 and 4, the stator is again carried by an annular collar 14A (FIGURE 3) screwed onto the main body of the mill head (not shown in FIGURE 3) and free to rotate with respect to the stator. The stator is keyed into the main body of the mill head, the upper part 17 of the stator being shown in chain-dot lines in FIGURE 3. The handles 15 of the collars 14 are replaced, in the case of each collar 14A, by a gear ring 18 pressed onto the collar 14A. This gear ring 18 is engaged with an output gear 19 of a gearbox 20. The gearbox 20 has an input shaft 21 mounted in bearings 21A, 21B carried by the housing 20A of the gearbox. The shaft 21 is driven by a motor 22 (FIGURE 2) through a flexible coupling 23, a helical worm gearbox 24 and a further flexible coupling 25. A spur gear 26 carried by the input shaft 21 is in mesh with a spur gear 27 fast on a main shaft 28 of the gearbox 20. The shaft 28 is also mounted in bearings 28A, 28B carried by the housing 20A. The output gear 19 is splined on this main shaft 28 so as to be fast in rotation therewith but free to slide axially thereof. The centre boss 29 of the gear 19 has a screw-threaded extension 29A engaged in a nut 30 fast with the housing 20A of the gearbox 20. The pitch of the thread of the nut 30 is the same as the pitch of the threaded connection (not shown) between the collar 14A and the main body of the mill head 12.

It will be appreciated that rotation of the shaft 21 brings about rotation of the collar 14A through the gear train 26, 27, 19 and 18. Due to the screw-threaded connection between the collar 14A and the main body of the mill head 12 this rotation of the collar 14A raises or lowers the collar 14A, and hence the stator, with respect to the main body of the mill head 12. The output gear 19 also moves up or down, sliding along the splines on the shaft 28, due to the engagement of the extension 29A with the nut 30. Since the pitch of the thread of the nut 30 is the same as the pitch of the threaded connection between the collar 14A and the body of the mill head 12 the gear 19 remains in full mesh with the gear ring 18 during up or down movement of the gear 19 and the gear ring 18. The ratios provided by the various inter-meshing gears are selected such that three revolutions of the main shaft 28 move the stator from one extreme position to the other, i.e. three revolutions of the main shaft 28 move the stator through a vertical distance of 12 mm. It will be appreciated that the position of the stator, and therefore the spacing between the stator and the rotor, is infinitely variable throughout this range of movement.

An extension 28′ of the shaft 28 projects into a potentiometer gearbox 31, the end of this extension 28′ carrying a pinion 32 serving as a drive pinion for the gearbox 31. This pinion 32 meshes with a gear 33 carried by a shaft 34. The gear ratio between the pinion 32 and the gear 33 is such that three revolutions of the pinion 32 rotate the gear 33 and thus the shaft 34 through 300°. Cams 35, 36 carried by the shaft 34 co-operate with micro-switches 37, 38 connected to the electrical control circuit already mentioned, the cams 35, 36 actuating the switches 37, 38, when the stator reaches its fully open or its fully closed position, to shut-off the motor 22. The shaft 34 also serves as the drive shaft of a potentiometer 39 connected to the electrical control circuit to give an electrical indication of the exact position of the stator relative to the rotor, 300° being the full scale movement of this potentiometer.

As has been mentioned previously, the five mills 1 to 5 are connected by ducts 6 to 9 so that material being processed passes successively from mill to mill in the direction from the mill 1 to the mill 5. The material passes from mill to mill under the action of centrifugal force. The outlet duct 11 of each mill carries a housing 40 in which a thermocouple (not shown) is disposed for detecting the temperature of material flowing from each of the mills. The housings 40 carry the thermocouples so that they extend into the outlet ducts 11 to detect the temperature of the material at the centre of the flow through the outlet ducts. The thermocouples are connected to the electrical control circuit mentioned above.

As already stated, the inlet duct 10 of the first mill 1 of the set is connected to a feeder apparatus such as that shown in FIGURES 4 to 7. The apparatus of FIGURES 4 to 7 is made up of the horizontal feeder 41 (FIGURES 4, 5 and 6) and the vertical feeder 42 (FIGURES 4 to 7), the horizontal feeder 41 including a rotatable Archimedean screw 41A for feeding material to the vertical feeder 42. The vertical feeder 42 includes a rotatable screw 42A for feeding material received from the horizontal feeder 41 to the first mill 1.

The horizontal feeder 41 consists of a hopper 43 rectangular at the top and having sloping sides 44, 45 so that the hopper 43 tapers towards its base. The hopper is provided with high and low level probe indicators (not shown) connected in the electrical control circuit mentioned above to indicate when the hopper 43 is full or requires filling. The base of the hopper 43 is formed as a semi-circular trough. The Archimedean screw 41A extends along the base of the hopper 43 and into an outlet duct 46 at one end 47 of the hopper 43. A first stub shaft (not shown) projecting from the end of the screw 41A is mounted in a cylindrical bearing bush (not shown) supported centrally in the outlet duct 46 by three ribs (not shown) spaced 120° apart from one another, there being sufficient room between the ribs, the inner wall of the duct 46 and the bearing bush for material to pass out of the duct 46. At its other end the screw 41A is supported by a second stub shaft which passes through bearings (not shown) carried by the end wall of the hopper 43 and extends from the hopper 43 to be driven by an electronically controlled motor 48 driving through a gearbox and a flexible coupling 49, the speed of the motor 48 being infinitely variable between the upper and lower limits of the motor. The variable speed motor 48 is connected to the electrical control circuit so that the speed of rotation of the screw 41A can be controlled. The hopper 43 is mounted relative to the set of mills 1 to 5 so that its end 50 remote from its end 47 is higher than the end 47. The axis of the screw 41A is thus slightly inclined to the horizontal. The lowest end of the screw 41A is that in the outlet duct 46. The hopper 43 is closed by a removable transparent cover plate (not shown).

The outlet duct 46 has a flange 46A bolted to a corresponding flange 51A of an inlet duct 51 of the vertical feeder 42. This vertical feeder 42 consists of a frusto-conical hopper 52 mounted in the plant so that its axis is vertical. The feed screw 42A of the vertical feeder 42 is also of generally frusto-conical shape and is mounted in the hopper 52 for rotation about the axis so that the blade 53 of the screw scrapes the curved wall of the hopper. The blade 53 extends from above the inlet duct 51 to below the duct 51. The shaft 54 upon which the blade 53 is mounted carries, at its lower end, a support member 55 consisting of a frusto-conical ring 56 supported by three ribs 57 extending from a collar 58 fast with the shaft 54. The ring 56 bears on the curved wall of the hopper 52 near the bottom thereof to support and locate the feed screw 42A, the ring 56 carrying an O-ring seal 59 disposed in a groove in the ring 56 and sealing on the wall of the hopper 52. There is sufficient room between the ring 56, the ribs 57 and the collar 58 for material to pass out of the hopper 52. The shaft 54 projects beyond the support member 55 and carries, below the member 55, blades 60 for scraping the lowest part of the curved wall of the hopper 52. These blades 60 ensure, during operation, that material does not block the outlet of the hopper 52. A flange 52A, carried by the curved wall of the hopper 52, is bolted to a corresponding flange 61A of an outlet duct 61 of the vertical feeder 42. The upper edge of the blade 53, which edge is above the inlet duct 51, terminates in an upturned-upright flange 53A. The lower edge of the blade 53, which is below the inlet duct 51 and above the support member 55, carries a downwardly directed flange 53B. Both the flanges 53A, 53B extend to the wall of the hopper 52. The flange 53A serves to ensure that material does not pass over the top of the uppermost flight of the blade 53 whilst the flange 53B ensures that material does not block the hopper 52 above the support member 55. The shaft 54 extends from the top of the hopper 52 and is supported by bearings (not shown) carried by a frame structure 62 which surrounds the hopper 52. This structure 62 also supports a motor 63 which drives the feed screw 42A.

The outlet duct 61 of the vertical feeder 42 is secured, through a flanged connection, to the inlet duct 10 (FIGURE 1) of the first colloid mill 1 of the set of five mills 1 to 5.

One example of a use of the equipment which has so far been described is the production of marzipan products such as macaroon paste from almonds and/or other nuts. In such a case the equipment so far described is included in a plant provided with hoppers for the necessary ingredients such as bitter almonds, sweet almonds, nuts other than almonds, sugar and albumen. The plant includes a pneumatic conveying system for conveying the nuts and sugar from bulk storage hoppers to feed hoppers from which these ingredients can be fed as necessary directly to a dry material weigh hopper. A further weigh hopper is provided so that a desired weight of water can be obtained separately of the weighing of the dry ingredients. The plant further includes a pre-mixer (not shown) into which the ingredients weighed in the two weigh hoppers can be dumped. This pre-mixer consists of a trough containing a rotatable agitator and it is disposed in the plant such that, after agitation of the weighed ingredients in the pre-mixer, these ingredients can be dumped in the horizontal feeder 41. It is to be noted that during agitation in the pre-mixer, hydrolytic and proteolytic enzymes commence their activities, these bio-chemical reactions influencing the flavour, colour and physical handling characteristics of the final product. These reactions only occur, when producing macaroon paste in the plant being described, during agitation of the raw materials in the pre-mixer and the pre-mixing process is therefore continued until the desired characteristics are obtained. The agitator is thus run for a predetermined time at a desired speed of 100 r.p.m. or less.

In the production of macaroon paste further sugar and albumen is added to the ingredients downstream of the set of colloid mills 1 to 5 and this will be referred to later.

The operation of the horizontal feeder 41, the vertical feeder 42 and the set of colloid mills 1 to 5 will be described assuming that the plant as a whole is being operated such that the weights of nuts, sugar and water necessary for producing raw marzipan are being supplied, as required, to the horizontal feeder 41. Such operation, it will be appreciated, can be controlled by electronic circuitry so that the plant as a whole runs either semi-automatically (which is the form which will be described hereinafter) under the control of an operator operating from an electrical control panel (not shown), or fully automatically with all operations controlled from punched tapes.

During operation the screw 42A of the vertical feeder 42 runs at a fixed speed of 50 r.p.m. and the operator at the control panel controls the speed of the screw 41A of the horizontal feeder 41 to ensure a steady flow of material through the vertical feeder 42 to the first mill 1. It will be noted that material is fed by the horizontal feeder 41 to the vertical feeder 42 at a zone intermediate the length of the vertical feed screw 42A of the feeder 42. This ensures that all the material fed to the vertical feeder 42 is forced, by the screw 42A, to pass from the outlet duct of the feeder 42, whereby said steady flow is achieved. The operator prepares (also from the control panel) desired weights of premixed ingredients in the pre-mixer and dumps these in the feeder 41 whenever a signal is received from the low level probe indicator of the feeder 41 that the level of material in the feeder 41 has reached this indicator. The high and low level probe indicators of the feeder actuate warning lights on the control panel if the level of material in the feeder 41 reaches either probe. All the mills will have been started and allowed to run up to full operating speed before commencement of production.

The fact that the spacing between the stator and rotor of each mill is adjustable has been described previously. In the production of raw marzipan and, thereafter, macaroon paste the mills 1 and 5, which are adjusted manually, are set, before the plant commences operation, the mill 1 to its fully open position and the mill 5 to its fully closed position. The three remaining mills 2, 3 and 4 are also set prior to operation of the plant, by operating the motors 22, to desired positions as indicated on the control panel by signals fed from the potentiometers 39. Since three full turns of the collars 14 or 14A represent full movemen of the stator of each mill from its fully closed position to its fully open position the position of the stator can be defined in terms of turns of the collar 14 or 14A from the position thereof corresponding to the fully closed position of the stator. Thus a typical series of settings for the collars 14 or 14A of the mills 1 to 5 at the commencement of operation of the mills would be 3.0, 1.6, 0.8, 0.4 and 0.0 turns respectively. These initial settings are determined, from prior testing, to be the settings necessary to give a required temperature of 105° C. of the product flowing from the mill 5. When the mills are operated in this way they not only reduce the raw material to a colloidal system but the action of the mills on the raw ingredients is such that the product emerging from the final mill 5 is raw marzipan (assuming of course, that the correct raw materials were fed to the first mill 1). The first mill 1 is placed in its fully open position because this mill receives the raw materials in their initial pre-mixed but unrefined state. The function of this mill, therefore, is to break down the materials from a granular/liguid mixture into a homogenous slurry. If the mill were set at other than its fully open position there would be a tendency for the mill to become over-loaded.

Although the series of settings given above for the mills may be satisfactory at the commencement of a production run, as the run continues the tendency is for the temperature in each mill to rise. This tendency can be noted by the operator from readings provided by the thermocouples in the housings 40 (which detect the temperature of the material flowing through the ducts 6 to 9 and 11) and the operator controls the settings of each of the mills 2, 3 and 4 to maintain a steady temperature in the material flowing from the mill 5. If desired signals indicating the mill motor current for each mill 1 to 5 can also be fed into the electrical control circuit of the plant and the operator can control the settings of the mills 2, 3 and 4, in dependence upon these signals and in conjunction with the thermocouple readings, to balance the work being done by each mill (as indicated by the amperage of the motor driving the rotor of the mill) in addition to maintaining said steady temperature. The operator may also have to vary the speed of the screw 41A of the horizontal feeder 41 to ensure correct feed material to the mill 1. These adjustments are usually only necessary during approximately the first five minutes of a production run, after which time little further adjustment is normally necessary.

The raw marzipan flowing from the last mill 5 passes passes down the discharge spout (not shown) connected to the outlet duct 11 of the mill 5 into a mixing machine (also not shown) or into one of two such machines if the plant is a continuously operating one. The or each mixing machine is mounted on a weighing platform so that a desired weight of raw marzipan can be supplied thereto. Where only one mixing machine is provided the plant upstream of the mixing machine is closed down temporarily once a desired weight of raw marzipan has been supplied to the mixing machine. Where two mixing machines are provided the desired weight of raw marzipan is supplied to one of the mixing machines and the discharge spout is then moved to supply raw marzipan to the other mixing machine.

The raw marzipan is subject to a vacuum in the mixing machine whilst the mixing mechanism in the machine is operated. A rapid evaporation of part of the free moisture in the raw marzipan takes place, for example a ¼ ton mix of raw marzipan is reduced from 105° C. to 50° C. in two minutes with a 2% loss of moisture. Thereafter, vacuum is broken and desired weights of sugar and albumen added and mixed into the marzipan to produce macaroon paste.

The mixing machine is tippable such that the macaroon paste produced can be tipped into the hopper of a packing machine (not shown).

It will be appreciated that although the horizontal and vertical feeders 41, 42 and the set of colloid mills 1 to 5 have been described included in a plant specifically described as producing macaroon paste utilising bitter and sweet almonds and other nuts, these ingredients can be varied according to recipe the operator is working to.

In connection with the plant which has been described it is to be noted that it is only necessary to pass the material being processed through the mill set once. Since the rate of feed material to the mill set can be finely controlled by varying the speed of rotation of the screw 41A of the horizontal feeder 41, and since the settings of the three mills 2, 3 and 4 can be varied as desired whilst material is passing through the mill set, it is possible to control, as desired, the temperature, degree of fineness, or state of homogenisation of product flowing from the last mill 5. A plant having a set of mills and a feed arrangement for feeding material to the mill set, similar to that of the plant described, can thus be used to process many semi-liquid or liquid substances, or granular substances in a liquid carrier, where a homogenous product is sought and fine control of a characteristic such as temperature, degree of fineness, or state of homogenisation of the material flowing from the last mill of the set is required. Of course, the set of mills might comprise more or less than five mills, the setting of at least one of the mills of the set being adjustable in the manner in which the setting of each of the mills 2, 3 and 4 of the plant described is adjustable.

Examples of substances other than raw marzipans and paste products of raw marzipan such as almond pastes or macaroon pastes which might be processed in such a plant are confectionery pastes and liquors such as praline-nougat, chocolate sauces, and unconched chocolate couverture prepared from cocoa beans; homogenised foodstuffs such as dairy-type cream prepared from unsalted butter and skimmed milk, cheese, salad cream, table sauces, filling creams and so on; homogenised suspensions such as fruit drinks, liquid syrups and concentrates such as ice cream; meat and fish pastes, patés, sausage meats and similar products; and non-foodstuff products such as cosmetics, toothpaste and dentrifices, soap products, paints, synthetic plastic materials and pharmaceutical creams, ointments and suspensions.

What I claim is:

1. Equipment for processing semi-liquid or liquid substances, or granular substances in a liquid carrier, the equipment comprising a set of mills, each mill of the set having a rotor and a stator co-operating with one another for reducing to a colloidal system material fed to the mill during operation thereof, feeding means for feeding material to be processed to the first mill of the set, controlling means for controlling the feed rate of the feeding means, connections between the mills of the set connecting the mills in series so that during operation material to be processed fed to the first mill of the set passes successively through the mills to the last mill of the set, adjusting means for adjusting the spacing between the stator and the rotor of at least one of the mills during operation thereof, said one mill having a main body, and said adjusting means including an annular collar carrying the stator of the mill, a thread connection between the collar and said main body, the stator being free to move axially of the mill but there being means securing the stator against rotation, said collar being able to move axially of the mill whilst rotating with respect to the stator, said adjusting means further including a gear ring fast with the annular collar and a gear box associated with the gear ring for rotating the ring and therefore the collar, thereby to move the stator axially of the mill and vary the spacing between the stator and the rotor.

2. Equipment according to claim 1, wherein said gear box has a housing, a nut fast with the housing, a shaft, and an output gear mounted on the shaft fast in rotation with the shaft but so as to be free to move axially of the shaft, the output gear having a screw-threaded boss engaged in said nut, and the output gear being in mesh with said gear ring, the pitch of the thread of said nut being the same as the pitch of the threaded connection between said collar and said main body whereby upon rotation of said shaft the output gear moves axially of said shaft, whilst rotating said gear ring, thereby to remain in mesh with said gear ring as said collar moves axially of the mill.

3. Equipment according to claim 1, wherein the spacing between the stator and the rotor of the mill that is adjustable by said adjusting means is infinitely variable from mill fully open to mill fully closed.

4. Equipment according to claim 1, and including electrical positioning indicating means associated with the gear box for indicating the position of the stator relative to its associated rotor.

5. Equipment for processing semi-liquid or liquid substances, or granular substances in a liquid carrier, the equipment comprising a set of mills, each mill of the set having a rotor and a stator co-operating with one another for reducing to a colloidal system material fed to the mill during operation thereof, feeding means for feeding material to be processed to the first mill of the set, controlling means for controlling the feed rate of the feeding means, connections between the mills of the set connecting the mills in series so that during operation material to be processed fed to the first mill of the set passes successively through the mills to the last mill of the set, adjusting means for adjusting the spacing between the stator and the rotor of a plurality of the mills of the set of mills during operation thereof, each mill having a main body, said adjusting means including annular collars screwed one on to the main body of each mill that is adjustable by said adjusting means, each collar carrying the stator of the mill upon which the collar is screwed, the stator so carried being free to move axially of the mill but there being means securing the stator against rotation, said collars being able to move axially of the respective mills whilst rotating with respect to the respective stators thereof, said adjusting means further including gear rings fast one with each annular collar, and gear boxes associated one with each gear ring for individually rotating the rings and therefore the collars thereby individually to move the stators axially of the mills and vary the spacing between the respective stators and the rotors.

6. Equipment for processing semi-liquid or liquid substances, or granular substances in a liquid carrier, the equipment comprising a set of mills, each mill of the set having a rotor and a stator co-operating with one another for reducing to a colloidal system material fed to the mill during operation thereof, adjusting means for adjusting the spacing between the stator and the rotor of at least one of the mills during operation thereof, feeding means for feeding material to be processed to the first mill of the set, controlling means for controlling the feed rate of the feeding means, connections between the mills of the set connecting the mills in series so that during operation material to be processed fed to the first mill of the set passes successively through the mills to the last mill of the set, the feeding means comprising a horizontal feeder including a feed screw therein, a vertical feeder including a feed screw therein for feeding material down into the first mill of the set of mills, the feed screw of the horizontal feeder arranged to feed material to be processed to the feed screw included in the vertical feeder at a zone intermediate the length of the feed screw of the vertical feeder, drive means for rotating the feed screw included in the vertical feeder at constant speed to feed material down into the first mill at a constant rate, and a variable speed motor for rotating the feed screw of the horizontal feeder, the speed of said motor being controlled by said controlling means.

References Cited

UNITED STATES PATENTS

| | | | |
|---|---|---|---|
| 2,188,666 | 1/1940 | Spohn | 241—259 X |
| 2,412,677 | 12/1946 | Eppenbach et al. | 241—259 |
| 3,117,734 | 1/1964 | McCarty et al. | 241—29 |
| 3,215,355 | 11/1965 | Shouvlin et al. | 241—101 X |

FOREIGN PATENTS 1,389,802  1/1965  France.

OTHER REFERENCES

Instrumentation and Automatic Control Systems in Modern Processing Plants, by J. R. Riede and G. C. Kachel, in Canadian Mining Journal, March 1961, pp. 67–69.

ANDREW R. JUHASZ, *Primary Examiner.*

FRANK T. YOST, *Assistant Examiner.*

U.S. Cl. X.R.

241—245, 248, 259, 301